United States Patent [19]

Nelson, III

[11] Patent Number: 5,179,621
[45] Date of Patent: Jan. 12, 1993

[54] DIRECT CURRENT POWER CONTROL CIRCUIT

[75] Inventor: James C. Nelson, III, San Antonio, Tex.

[73] Assignee: DAX Industries, Inc., Colorado Springs, Colo.

[21] Appl. No.: 707,619

[22] Filed: May 29, 1991

Related U.S. Application Data

[63] Continuation-in-part of Ser. No. 453,671, Dec. 20, 1989, Pat. No. 5,029,229.

[51] Int. Cl.$^5$ .............................................. H02P 7/00
[52] U.S. Cl. ................................... 388/811; 388/910; 388/915; 318/138; 318/139; 318/254; 318/439
[58] Field of Search ...................... 388/804–805, 388/811, 819, 831, 824, 838, 910, 915, 917–918; 318/138, 139, 439, 254

[56] References Cited

U.S. PATENT DOCUMENTS

| | | | |
|---|---|---|---|
| 3,952,236 | 4/1976 | Hoover | 318/139 |
| 4,129,810 | 12/1978 | Harshberger, Jr. | 388/811 |
| 4,146,827 | 3/1979 | Krohn | 388/811 |
| 4,153,853 | 5/1979 | De Villeneuve | 388/829 |
| 4,199,898 | 10/1978 | Morton et al. | 388/811 |
| 4,204,143 | 5/1980 | Coleman | 388/811 |
| 4,300,081 | 11/1981 | Van Landingham | 388/811 |
| 4,309,645 | 1/1982 | De Villeneuve | 388/829 |
| 4,380,724 | 4/1983 | Franz, Jr. et al. | 388/819 |
| 4,386,302 | 5/1983 | Iwasawa | 388/811 |
| 4,458,183 | 7/1984 | Neilson | 388/815 X |
| 4,471,276 | 9/1984 | Cudlitz | 388/811 |
| 4,523,134 | 6/1985 | Kinoshita et al. | 388/811 |
| 4,562,393 | 12/1985 | Loyzim et al. | 388/811 X |
| 4,617,675 | 10/1986 | Ashikaga et al. | 388/811 X |
| 4,626,750 | 12/1986 | Post | 318/139 |
| 4,841,165 | 6/1989 | Bowles | 388/831 X |
| 4,843,288 | 6/1989 | Volz et al. | 388/811 X |
| 4,871,952 | 10/1989 | Ishizaka et al. | 388/829 |
| 5,029,229 | 7/1991 | Nelson, III | 318/811 |
| 5,087,865 | 2/1992 | Nelson, III | 318/139 |

Primary Examiner—William M. Shoop, Jr.
Assistant Examiner—David Martin
Attorney, Agent, or Firm—Gunn, Lee & Miller

[57] ABSTRACT

A solid state DC power control circuit to efficiently use DC battery power without the normally associated energy waste which includes an input control signal filtering, amplifying, and conditioning circuit (133), a triangular waveform generator circuit (131), a comparator circuit (135), an inverting MOSFET (metal oxide semiconductor field effect transistor) circuit (137), and a plurality of power MOSFET devices (42), which together combine to translate a typical variable resistance control input into a voltage level and condition it suitably to be compared with a known triangular waveform thereby creating a pulse width modulated signal whose pulse widths correspond in duration to the relative percent "on" or "off" of the control input signal and which regulates a plurality of parallel MOSFET devices (42) which together share the load of an external DC power drain circuit (143).

1 Claim, 2 Drawing Sheets

DIRECT CURRENT POWER CONTROL CIRCUIT

This is a continuation-in-part of copending application Ser. No. 07/453,671 filed on Dec. 20, 1989 now U.S. Pat. No. 5,029,229.

BACKGROUND OF THE INVENTION

1. Field of the Invention

This invention relates generally to direct current power control circuits. This invention applies anytime a DC battery is used in an application requiring less than constant full battery discharge and, more specifically, to circuits for controlling the speed of motors associated with DC battery powered motors or vehicles.

2. Description of the Related Art

The most common method of regulating the speed of a DC electric motor typically involves placing a variable resistor or a sequence of discrete resistors in series with the windings of the electric motor. While this method does provide sufficient speed control of the motor it has two disadvantages. First, the power drawn from the in such an arrangement is not efficiently reduced in direct proportion when the speed of the motor is reduced. This is because a portion of the power is dissipated through the resistors rather than entirely through the motor. The same current drain occurs on the battery whether the motor is run at high speed or low speed. The only change is in the relative distribution of the load between the resistors and the motor windings. In some applications the current drain does decrease as the motor decreases speed however the power efficiency of the drain also decreases. A second disadvantage which is a by product of the first, is that the power dissipated through the resistors is given off as heat, which besides being a waste of energy, can be a problem for some applications.

One attempt at a solution to the problem is to utilize solid state switching devices to control and regulate the current flow to the motor windings. One type of solid state switching device capable of handling the currents typically required by large electric motors is the SCR (silicon control rectifier). SCRs function much as a mechanical switch might by allowing a large current to flow between two points when a relatively small voltage is present to toggle the rectifier. In a solid state circuit a SCR can be pulsed so as to "chop" the current through an electric motor thereby regulating the current flow and, thus, the motor speed. While SCRs do have lower energy losses than the resistor control arrangements they still result in a substantial dissipation of power in the form of heat. SCRs are also relatively large solid state components and are often high in cost. SCRs additionally suffer the drawback of characteristically poor load sharing when placed in parallel across a large load.

A more promising solid state device that to all appearances functions in much the same way as an SCR is the metal oxide semiconductor field effect transistor or MOSFET. Like the SCR a MOSFET allows a relatively large current to flow in a circuit when a relatively small "gate" current toggles it "on". Unlike the SCR a MOSFET enjoys the advantages of having very high input impedance, good load sharing propensity, small size, low cost, and very fast switching times.

The fast switching times of MOSFET devices allow them to function at very high frequencies compared to the slower SCRs. This creates the added advantage of operation at a level that is above the range of human hearing and therefore allows relatively quiet control of the electric motor. The higher frequencies do however have the disadvantage of creating larger voltage spikes when the MOSFETs are switched on and off. This would counsel for the use of MOSFETs with higher voltage ratings to handle these spikes, but with the higher voltage ratings come higher internal resistances and lower current capacities. One solution to this problem is to provide external freewheeling diodes to act as transient suppression devices across the load.

Another attempted solution is described in Post, U.S. Pat. No. 4,626,750. Post's attempted solution is to use an electronic circuit chopper control system to control groups of parallel field effect transistors and parallel power diodes. The power diodes are distributed apart from each other and among each group of field effect transistors. Post attempts to reduce voltage spikes caused by the field effect transistors being turned on and off by using the power diodes to draw counteracting current from the battery. Unfortunately, this arrangement results in excess heat which must be dissipated through fins, which in turn results in less efficient power drain from the battery. Post also requires a complex control circuit to ensure that the system operates safely within acceptable parameters so as to not damage the electronic components or host vehicle.

SUMMARY OF THE INVENTION

It is therefore an object of this invention to provide a reliable and efficient means of regulating the discharge of a DC battery.

A further object of this invention to provide a reliable and efficient means of regulating the speed of DC electric motors of the type commonly used in electrically powered vehicles.

Another object of this invention to provide a means of regulating the speed of an electric motor by drawing from the battery only such current as is required by the motor and without suffering substantial losses of battery power through heat dissipation.

It is a further object of this invention to provide a circuit that employs solid state MOSFET devices to achieve the above stated objects and at the same time is capable of functioning at frequencies at or above human hearing, is capable of handling large currents, is capable of operating across a large range of direct current voltages, and is capable of limiting transient voltage spikes that occur during switching so as not to damage the MOSFET devices.

It is also an object of this invention to achieve the above stated objects through a minimum of circuitry and in a manner that is both durable and versatile in its ease of application so as to be used in a wide range of applications.

This invention provides a solid state direct current power control circuit which includes an input control signal circuit, a waveform generator circuit, a comparator circuit, an inverting MOSFET (metal oxide semiconductor field effect transistor) driver circuit, a plurality of power MOSFET devices, and a transient voltage suppression diode, which together combine to translate a typical variable resistance control input signal into a voltage level signal and condition it suitably to be compared with a known waveform thereby creating a pulse width modulated signal whose pulse widths correspond in duration to the relative percent "on" or "off" of the control input signal. The circuit incorporates a plurality of parallel MOSFET devices whose gates are regulated by the modulated signal and which together share the load of an external DC motor circuit.

DESCRIPTION OF THE PREFERRED EMBODIMENTS

Figure 1:
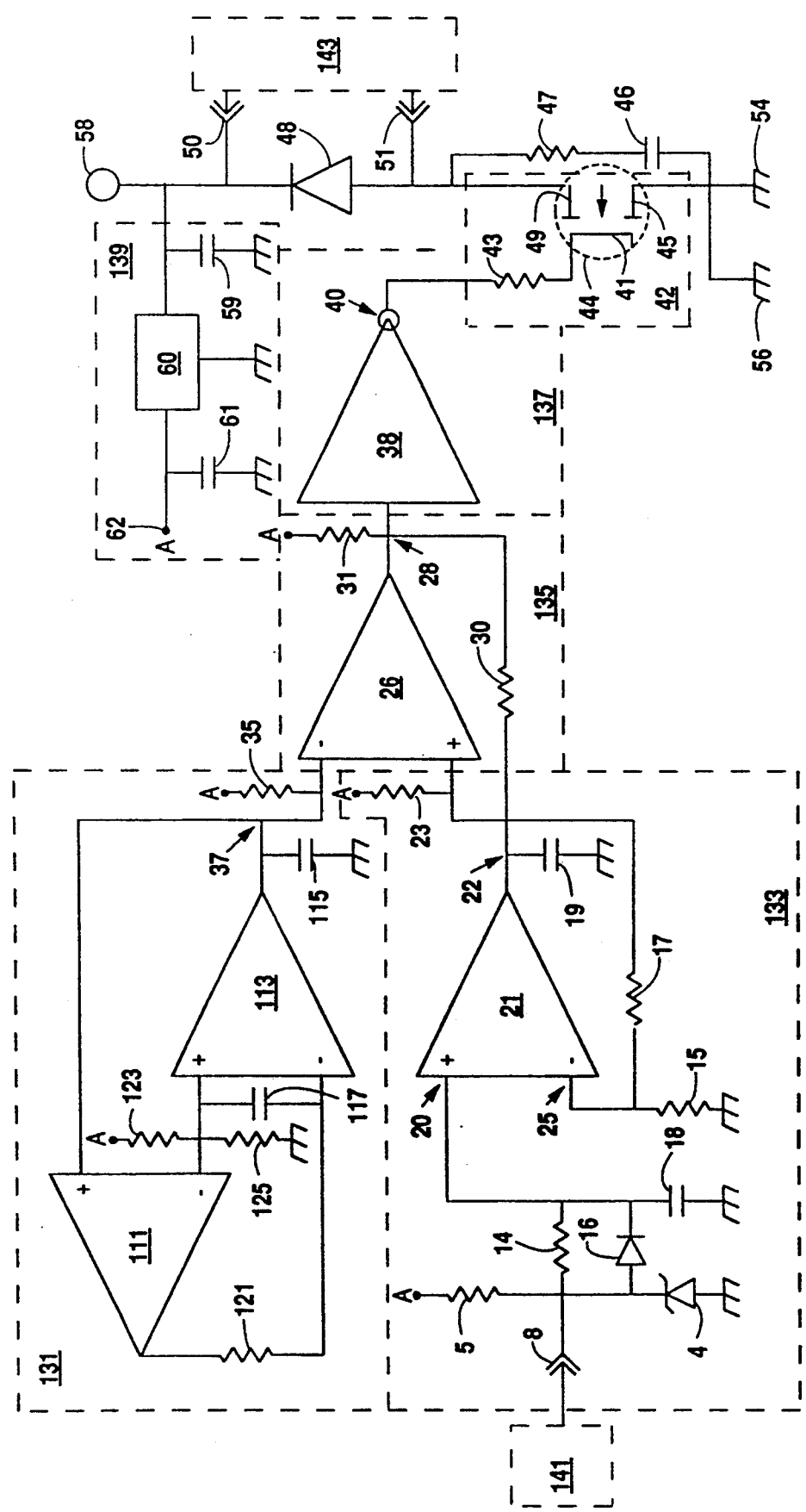
FIG. 1 is a schematic circuit diagram of the preferred embodiment of the invention which indicates both functional parts of the overall circuit and some specific components thereof.

Reference is now made to FIG. 1 for a detailed description of one embodiment of the design of the present invention. Other embodiments are possible as the use for controlled, efficient discharge of a DC battery changes or as the output power requirements change. The circuit disclosed in FIG. 1 comprises a number of identifiable functional parts which will first be described generally and interrelated with one another and then subsequently be described individually in more specific detail. FIG. 1 also makes reference to a number of external circuits which are not explicitly described. These circuits are not considered part of the disclosed embodiment of the invention, but will be described in sufficient detail to clarify the function of the invention and its interrelationship with these circuits.

The circuit in FIG. 1 is composed generally of; a non-inverting operational amplifier circuit (133), a triangular waveform generator circuit (131), a comparator circuit (135), an inverting MOSFET (metal oxide semiconductor field effect transistor) driver circuit (137), a MOSFET network (42), a freewheeling diode (48), and a voltage regulator circuit 139). In addition there are two external circuits generally positioned in FIG. 1 where they would be functionally connected to the circuit of this invention. These are designated as input control circuit (141) and DC motor circuit (143).

The main function of the disclosed circuit is the regulation of the MOSFET network (42) which in turn regulates the current flow through the external motor circuit (143). The current flow through the motor circuit (143) determines the motor speed and thus the speed of the vehicle. The regulation of the MOSFET network (42) is accomplished by creating a modulated signal whose pulse width reflects the extent to which the external input control circuit (141) indicates an "on" or "off" condition. Thus, the ultimate goal of the circuit is to take the mechanical displacement of an external motor speed control (not shown) and translate it into a pulse regulated flow of current through the DC motor circuit (143).

This control of the DC motor circuit (143) begins in an external input control circuit (141). The external input control circuit 141 may supply either a voltage, current, or resistance input; however, in this embodiment it is capable of supplying input point (8) with a voltage that is indicative of the mechanical position of an external motor speed control (not shown) and therefore of the drive current desired on the motor circuit (143). Typically the external input circuit (141) will establish a variable resistance between the input point (8) and a common ground that decreases when the external speed control is increasingly displaced. This may be accomplished by means of a continuous variable resistor or by sequentially switching in a plurality of discrete parallel resistors. Whatever the mechanism, the input control circuit (141) should provide a resistance to ground that is inversely indicative of the desired drive on the vehicle/motor.

Figure 2:
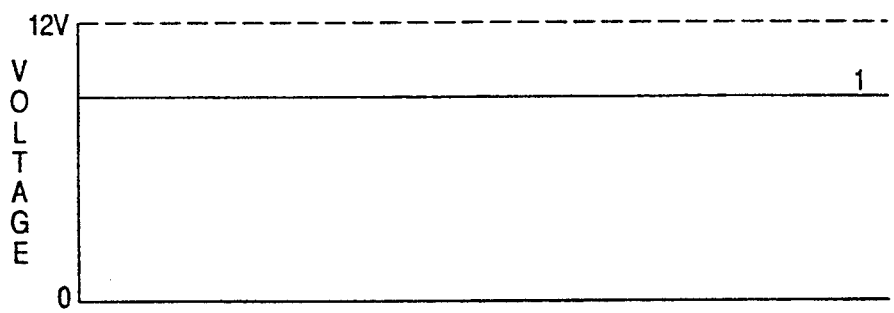
FIG. 2 is a graphic representation of the output signal from the operational amplifier (133) of the circuit in FIG. (1).

The non-inverting operational amplifier circuit (133) translates the resistance level provided by the external input control circuit (141) into a voltage level that is likewise inversely indicative of the desired drive on the vehicle/motor. The operational amplifier circuit (133) then filters and amplifies the voltage signal to a level and condition that allows it to be compared to the level and condition of a known waveform. An example of the voltage output at point (22) of the operational amplifier circuit (133) can be graphically seen in FIG. 2. Line 1 in FIG. 2 represents the voltage level present when the external motor speed control is at approximately a 20% "on" condition. A 50% "on" condition would result in a lower voltage output at point from the amplifier circuit (133).

The non-inverting operational amplifier circuit (133) currently gives an acceleration which is characteristically a very slow start which gradually gets up to a speed and then holds that speed. The non-inverting operational amplifier circuit (133) may be easily modified if different acceleration characteristics are desired. If quicker response is desired a capacitor could be placed in parallel with resistor (14). Filtering could be eliminated to give an instantaneous response. The present differentiator (21) could also be changed into an integrator by switching resistor (14) and capacitor (18).

Figure 3:
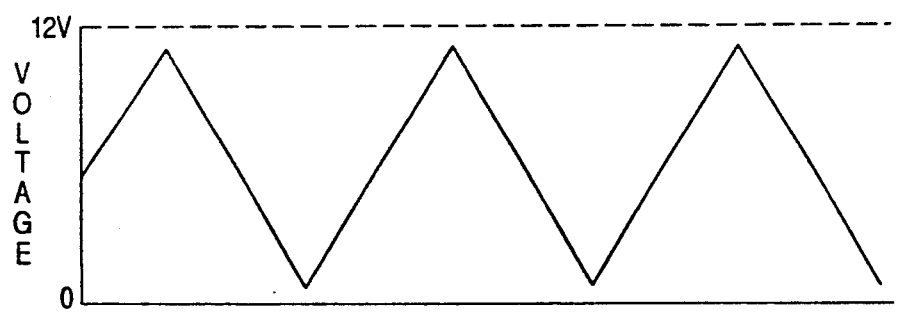
FIG. 3 is a graphic representation of the output signal from the triangular waveform generator (131) of the circuit in FIG. 1.
Figure 4:
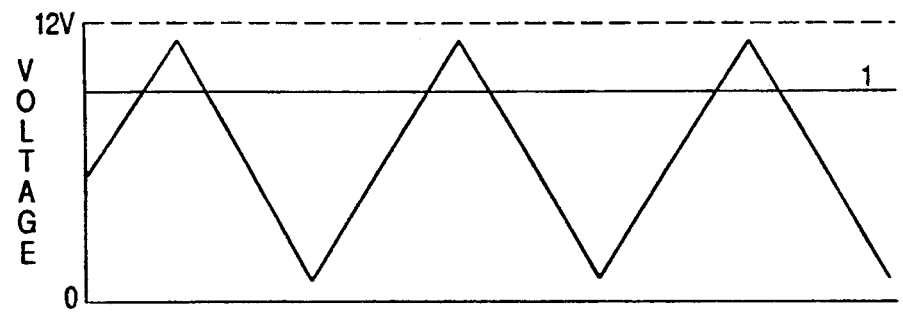
FIG. 4 is a graphic representation of the combination of FIG. 2 and FIG. 3.

The reference waveform required by the comparator circuit (135) can be a symmetrical or asymmetrical waveform. In this embodiment, the reference waveform is preferably a triangular wave generated in a frequency range of at or above 20,000 Hertz so as to be above the level of normal human hearing. The wave could also be generated below 20,000 Hertz, but this could then be heard by humans. Such a waveform is generated by the triangular waveform generator (131) of FIG. 1. An example of the output at point (37) of the triangular waveform generator circuit (131) may be seen graphically in FIG. 3. The waveform created is conditioned to be comparable in amplitude to the range of voltage levels provided by the operational amplifier circuit (133) at point (22) as illustrated in FIG. 4.

Figure 5:
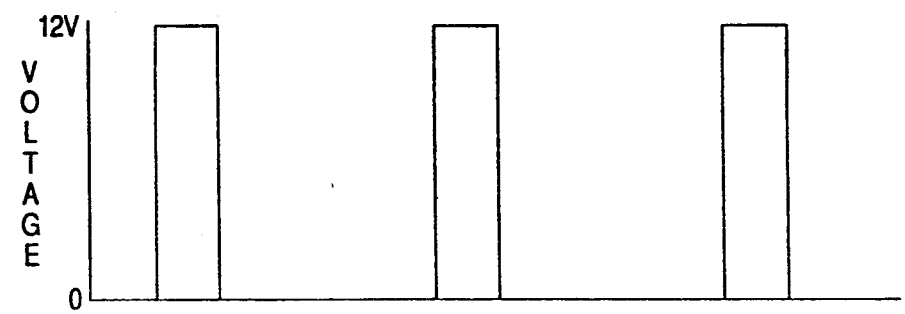
FIG. 5 is a graphic representation of the output signal from the comparator (135) of the circuit in FIG. 1.

The output of the operational amplifier circuit (133) is compared to the output of the triangular waveform generator circuit (131) by way of the comparator circuit (135). The comparator circuit (135) has an output that flip flops between rails of 12 volts DC and 0 volts DC depending on the relative amplitudes of the two input signals. The amount of time each cycle that the output of the comparator circuit (135) holds at 12 volts DC is equal to the amount of time each cycle that the triangular wave signal exceeds the amplitude of the operational amplifier output voltage. The resulting output of the comparator circuit (135) at point (28) would therefore have a pulsed waveform similar to that shown in FIG. 5. While the period and the frequency of the signal are the same as and are determined by the triangular waveform, the pulse width of the signal will vary according to the voltage level of the output of the operational amplifier circuit (133). A high operational amplifier circuit voltage will result in a small portion of the triangular wave that exceeds that voltage, and therefore will result in a short 12 volt DC pulse width. It is the pulse width therefore, that is now inversely related to the desired vehicle/motor speed.

To create a direct relationship instead of an inverse relationship and to condition the signal for the MOSFET network (42) an inverting MOSFET driver (137) is inserted in series at the output of the comparator circuit (135). This driver (137) creates a current in a range of 1 amp to 72 amps but in this embodiment it creates up to 6 amps at either the 12 volt DC rail or the 0 volt DC rail for input into the MOSFET network (42). The signal is also inverted so that a broader 12 volt pulse width corresponds to a greater vehicle/motor speed.

The output signal from the inverting MOSFET driver circuit (137) is then fed into a network of parallel power MOSFET devices (42). These devices (42) act as switches that open and close in response to the gate current provided by the MOSFET driver circuit (137). The pulse width of the signal from the MOSFET driver (38) therefore determines the pulsed current flow through the drain (49) source (45) connections on the parallel MOSFET devices (42).

This pulsed current flow is directed through the external DC motor circuit (143) by way of connections (50) and (51), and thereby regulates the motor speed. A freewheeling diode (48) placed across the load serves to suppress transient voltage spikes that occur when the MOSFETs are rapidly switched on and off. The freewheeling diode (48) may be placed close to the motor field windings or may be built as part of the DC power control circuit. In addition, the diode is preferably a large, hi-power, fast reversing diode.

One ancillary circuit not mentioned above but indicated in FIG. 1 is a voltage regulator circuit (139) that provides the operational 12 volts DC that the circuit requires from the typical 36 volt DC battery (58) that most electric vehicles use to function. This invention may be used on batteries ranging from 6 volts to 600 volts with operational volts in the range of 3 volts to 120 volts.

The invention has been described in relation to use in battery powered golf carts, fork lifts' drive battery system, fork lifts' hydraulic lift system, and battery powered baggage trucks. However, the invention is usable in a wide variety of applications including, but not limited to boats, trolling motors, arch welding, electroplating, heating, conveyors, and unmanned vehicles.

While the above is a general overview of the circuit as a whole, what follows is a more detailed description of the elements of each of the functional blocks within the circuit. The specific voltage, current, and resistance numbers should not be construed as maximum or minimum values but only as those values which are used in this preferred embodiment because other values could be used with simple electronic circuit calculations. In addition, the control circuit could be easily made into an integrated circuit. For example, a pulse width modulated controller integrated circuit could include the amplifier, the modulator, the oscillator, and the comparator described above. And, a pulse width modulator driver/controller integrated circuit could include the amplifier, the modulator, the oscillator, the comparator, and the driver described above.

The input control circuit (141) essentially acts as one resistor of a voltage divider pair in conjunction with resistor (5) and creates a voltage at point (8) in a range from 0 to 5 volts DC that varies as the resistance established by the input control circuit (141) varies. Once this voltage is established at point (8) it is conditioned and amplified by the non-inverting operational amplifier circuit (133). Within this circuit the following components provide the following characteristics. Resistor (5) is essentially a pull up resistor which when paired with the resistance of the input control circuit (141) provides a voltage at point (8), as described above, which is inversely proportional to the desired drive on the vehicle/motor. Zener diode (4) is a 5 volt diode which holds point (8) at a steady state of 5 volts DC without a load. Resistor (14), resistor/diode pair (13)/(16), and capacitor (18) together combine to create a filter circuit to condition the input voltage from point (8) to the input (20) of the operational amplifier (21). Resistor (14) provides for a slow change in voltage from 5 volts DC down to 0 volts DC when the input control circuit (141) resistance decreases upon "acceleration". Resistor/Diode pair (13)/(16) provides a resistance for a controlled change in voltage from 0 volts DC to 5 volts DC when deceleration is desired. Capacitor (18) provides the RC time constant for the filter circuit, and ties the positive input (20) of operational amplifier (21) to a steady state +12 VDC. When power is turned on, capacitor (18) is pulled down from this steady state to 5 VDC (a full off condition). This prevents operational amplifier (21) from seeing 0 VDC (a full on condition) momentarily when the power is turned on. This eliminates the instantaneous full-on to full-off jump that might otherwise occur.

Once filtered, the voltage at point (20) is further conditioned by the operational amplifier (21) and is output from the operational amplifier (21) at point (22). Feedback resistor (17) provides stabilization for the operational amplifier (21) and gain resistor (15) regulates the gain of the operational amplifier (21) by connecting the inverting input (25) to ground. Capacitor (19) further filters the voltage signal at the output of the operational amplifier (21). The output signal at point (22) from the non-inverting operational amplifier (21) is represented in FIG. 2. This output voltage can vary from 0 to 12 volts DC depending upon the resistance in the external input control circuit (141).

Parallel to the operational amplifier circuit (133) and above it in FIG. 1, is a triangular waveform generator (131). The generator is composed of two operational amplifiers; (111) and (113). The first amplifier (111) is in a non-inverting condition, and the second (113) is in an inverting condition. This combination of operational amplifiers provides an oscillator which generates a triangular waveform at point (37) similar to the graphic depiction in FIG. 3. The capacitors (115) and (117) provide the time constant for the oscillation. The voltage divider network of resistors (123) and (125) provide the biasing of the waveform for symmetry. Resistor (121) determines the amplitude of the waveform. The output signal at point (37) is pulled up by resistor (35) and the output of the non-inverting operational amplifier circuit (133) at point (22) is pulled up by resistor (23). Each of these outputs then become the inputs for the comparator circuit (135).

The positive input of the comparator (26) receives the signal from the non-inverting operational amplifier circuit (133) at point (22) and the negative input of the comparator (26) receives the signal from the triangular waveform generator (131) at point (37). The comparator (26) takes the two signals, compares them, and outputs a signal that flip-flops between a positive nominal voltage of 12 volts DC and a negative nominal voltage of 0 volts DC, depending upon whether the triangular waveform falls above or below the operational amplifier output level at any particular point in the waveform cycle. The comparison of these two waveforms can best be seen by superimposing the signal in FIG. 2, with the signal in FIG. 3. The resulting output of the comparator (26) can be seen in FIG. 5. The output of the comparator (26) is a sequence of pulses, the widths of which are determined by the amount of time the triangular waveform falls above the operational amplifier output (duration of the 12 volt pulse) and the amount of time it falls below the operational amplifier output (duration of the 0 volt pulse). The output (28) of the comparator (26) is pulled up by resistor (31). Feedback resistor (30) is a hysterisis resistor which serves to stabilize the comparator (26).

Up to this point in the circuit the pulsed signal is inversely related to the current flow required by the motor circuit (143) for acceleration. In other words, where ever the signal was high, i.e. 12 volts DC at the output of the comparator (26), the motor circuit would correspondingly decelerate or stop. When the signal was low, i.e. 0 volts DC, the motor circuit would accelerate or turn on full. At the output (28) of the comparator circuit (135) the pulse width modulated signal enters an inverting MOSFET driver (38). This MOSFET driver (38) conditions the signal suitably for a plurality of MOSFET devices in the MOSFET network (42). The output at point (40) of the inverting MOSFET driver provides up to a 6 amp current at 12 volts DC or 0 volts DC for the upper and lower rails in the pulse width modulated signal. This output is then paralleled to fifteen MOSFET circuits or one large MOSFET represented by a schematic of one such circuit generally described as (42) in the diagram. Each of these circuits (42) is comprised of a resistor (43) and a MOSFET device (44). The MOSFET device (44) has a gate (41), a drain (49), and a source (45). Connected to this MOSFET circuit (42) is a resistor/capacitor pair (47/46) that serves as a snubber across the drain (49) and source (45) connections on the MOSFET device (44). The outputs of all fourteen of these MOSFET circuits (42) are paralleled together into one end of the external motor circuit (143) at point (51). Between this point (51) and the battery supply (58) at point (50) is included a freewheeling diode (48) for transient voltage suppression. The MOSFET network (42) is connected to a common ground (56) which is in turn connected to the battery ground (54).

Ancillary to the MOSFET network and the previously described amplifier circuits is a voltage regulator circuit (139) which includes voltage regulator (60) and capacitors (59) and (61). Capacitor (59) serves to filter the 36 volts DC off of the battery (58) into the voltage regulator (60). Capacitor (61) serves to filter the 12 volts DC out of the voltage regulator (60) to the balance of the circuit, connections being represented by the Letter "A". The 12 volts DC is provided to every point so indicated in the circuit.

The MOSFET devices (44) have the distinct advantage of a high input impedance, a very fast switching time, a positive temperature coefficient of resistance, and a fair degree of automatic load sharing. The type of MOSFET device (44) capable of handling the output of the driver (38) (6 amps at 12 volts DC) may be found in an IRFZ40 type MOSFET. This is an "n channel enhancement" MOSFET device. These parallel MOSFET devices thus provide a method for controlling the current flow through the motor circuit (143) by way of connections (50) and (51).

The invention is designed to be easily assembled and able to withstand the rigors of normal use outside of the test environment. This durability is due in part to the simple DC power control circuit and the assembly process. Assembly uses plate technology instead of the traditional rail technology.

The assembly process (not shown in the drawings) starts with the power bus being demountably attached to the ground bus. The power bus assembly is then demountably attached to a plate. Screws are then used to mount each of the MOSFET's tabs to the plate on both sides of the ground bus assembly. The two diodes are then attached to the plate with a screw through each diode's end connector for the power bus to be attached later and another screw with a lock washer through the center holes for later mounting of a control board.

The power bus assembly will then be attached across the embodiment between the two diodes using the two end screws of the diode. The power bus assembly is ideally located near the end of the plate. The control board then has the two wires that come from the power board attached to the appropriate points on the control board. Then control board is then attached to the power bus assembly using the screws that are in the center of the diode embodiments with a stand-off brass bushing to hold the control point at the proper level. The voltage regulator device which is below the control board, will be attached to the ground bus assembly next by using the screw through the access hole through the board. The control board is then tightened down on the top of the diodes. The capacitor will be attached to the diode for the positive lead and the ground bus assembly for the negative lead and will sit at the end of the device. The enclosure cover will then be lowered over the device after applying the proper amount of sealant to the enclosure holes and also a bead around the embodiment. A nut will then be pulled down on each of the three screws that are protruding from the top of the cover and a nut on the control connector will also be tightened. The DC power control device is then ready for testing, packaging and shipping. When assembled the device measures approximately 6" wide by 8¼" long and 2¼" high.

Heat dissipation is not lessened for a couple of reasons. First, the amount of heat generated is small because only the amount of energy needed is being drawn from the battery. Normally, a full load is drawn from the battery with the excess energy being dissipated through resistors in the form of heat. Second, the base plate is actually feeding all the heat. The base plate is being attached to the device and is actually its own heat sink and it sinks into the device's space. When attached to the frame of the device, the frame is actually dissipating the heat. Therefore, the normally required heat dissipating fins are not required.

Although the invention has been described with reference to a specific embodiment, this description is not meant to be construed in a limiting sense. Various modifications of the disclosed embodiment, as well as alternative embodiments of the invention, will become apparent to persons skilled in the art upon reference to the description of the present invention. It is therefore contemplated that the appended claims will cover such modifications that fall within the true scope of the invention.

I claim:

1. A direct current electric motor control circuit for the efficient discharge of a direct current power source through a direct current power drain in a manner that allows for longer power source life and longer time between power source recharging since power is drawn only as needed without large amounts of wasted power dissipation through resistors as heat, comprising:

an input connection to an external input control variable resistance circuit;

a pull up resistor and a zener diode arranged so as to translate a variable resistance at said input connection into a correspondingly variable voltage level at said input connection;

a filter circuit comprising a resistor and a resistor/diode pair in parallel connection to each other and in series connection to said input connection, and a capacitor in series connection with said resistor and said resistor/diode pair and with a circuit high voltage;

a solid state operational amplifier circuit having a positive input, a negative input, and an output, and arranged in series connection with said filter circuit, said positive input of said operational amplifier being in series connection with said filter circuit, said operational amplifier having a gain resistor in series connection to a ground, said operational amplifier further having a stabilizing feedback resistor connecting said output to said negative input of said operational amplifier, said operational amplifier further having an output filtering capacitor in series connection to a ground;

a triangular waveform generator circuit comprising a first and a second operational amplifier device, said first and second operational amplifier devices each having a positive input, a negative input, and an output, said first operational amplifier device being configured in a non-inverting condition and said second operational amplifier device being in an inverting condition, said output of said first operational amplifier device being in connection with said negative input of said second operational amplifier device, said negative input of said first operational amplifier device being in connection with said positive input of said second operational amplifier device and being further held at a biasing voltage by a first and a second biasing resistor, said second operational amplifier device further having a first capacitor connected across said positive and said negative inputs of said second operational amplifier device and a second capacitor connected from said output of said second amplifier device to a common ground;

a comparator circuit comprising a solid state comparator, said comparator device having a positive input, a negative input, and an output, said negative input being arranged for connection to said triangular waveform generator circuit, said positive input being arranged for connection to solid state operational amplifier circuit, said comparator device further having a pullup resistor and a feedback resistor at said output of said comparator device;

an inverting MOSFET driver circuit comprising a solid state MOSFET driver device, said driver device having an input and an output, said input of said driver device being arranged for connection to said comparator circuit;

at least one MOSFET circuit comprising a power MOSFET device and a resistor, said resistor being arranged for connection to said driver circuit, said MOSFET device having a gate connection, said gate connection being arranged for connection to said resistor, said MOSFET device having a source connection, said source connection being arranged for connection to an external power drain circuit, said MOSFET device having a drain connection, said drain connection being arranged for connection to a current source ground;

a resistor/capacitor pair connected in series, said resistor/capacitor pair being arranged for connection across said MOSFET circuit; and a freewheeling diode being arranged for connection across said external power drain circuit.

* * * * *